July 18, 1933.  F. J. HENRY  1,918,266
BOX TRAP
Filed Oct. 12, 1931
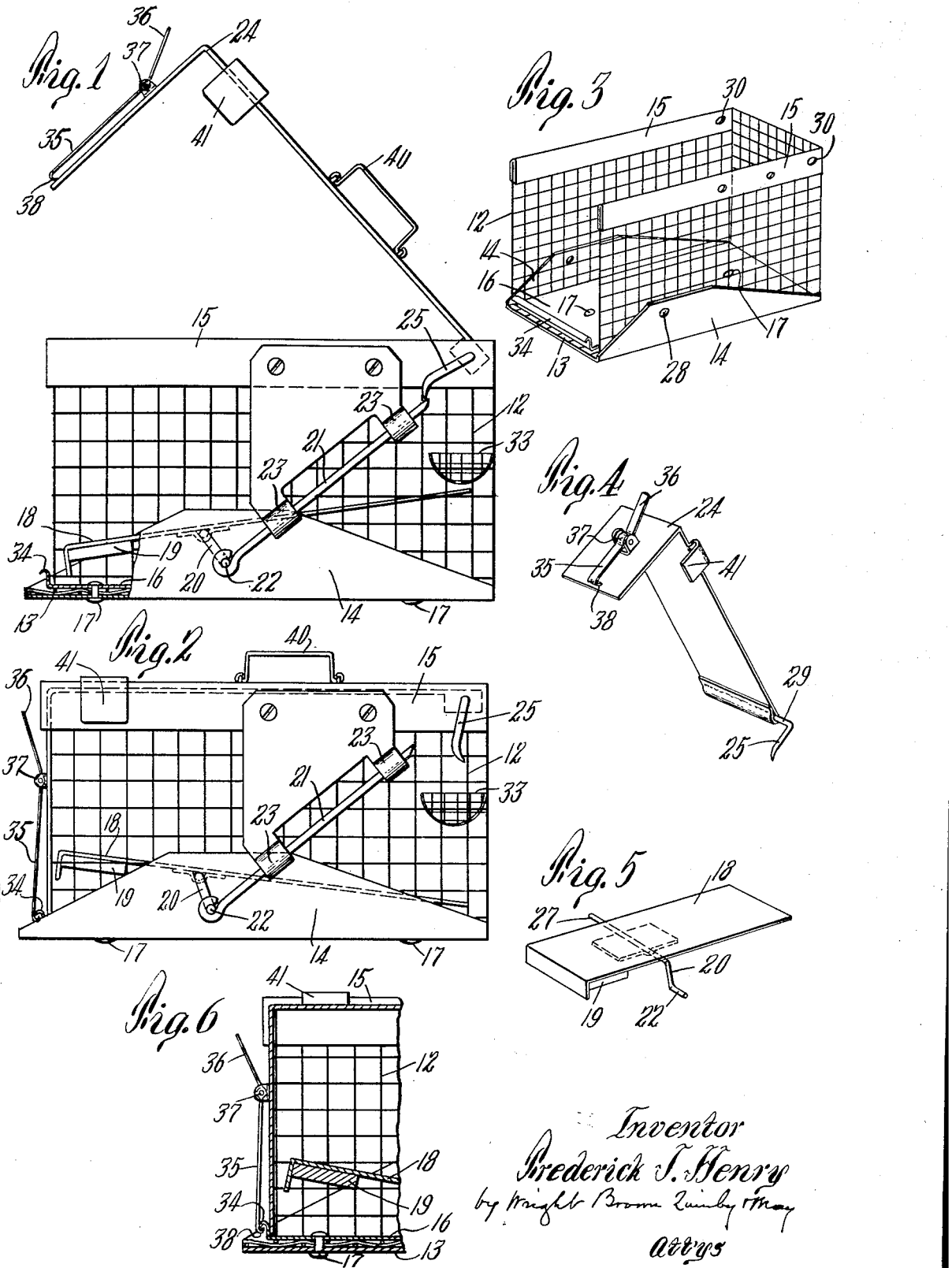
Inventor
Frederick J. Henry
by Wright Brown Quinby & May
attys Patented July 18, 1933

1,918,266

UNITED STATES PATENT OFFICE

FREDERICK J. HENRY, OF TAUNTON, MASSACHUSETTS

BOX TRAP

Application filed October 12, 1931. Serial No. 568,365.

This invention relates to a box trap comprising a body which includes a bottom, side walls, and one end wall, the body being open at the top and another end, and an angular cover formed to close the open top and end of the body.

One object is to provide a trap having improved means for holding the cover open and thereby setting the trap, and insuring the springing or closing of the trap by an animal entering it.

Another object is to provide an improved construction of the body, said construction including open mesh wire fabric, and sheet metal reinforcing parts, the whole forming a body of adequate strength and durability and minimum weight.

Of the accompanying drawing forming a part of this specification,—

Figure 1 is a side view of a trap embodying the invention showing the trap set, parts being shown in section.

Figure 2 is a side view showing the trap sprung or closed.

Figure 3 is a perspective view of the body.

Figure 4 is a perspective view of the cover.

Figure 5 is a perspective view of the tilting platform shown by Figures 1 and 2.

Figure 6 is a fragmentary sectional view showing the forward end of the trap, the cover being closed and confined so that it cannot be opened by an animal within it.

The same reference characters indicate the same parts in all of the figures.

The body of the trap shown separately by Figure 3 includes a bottom, side walls, and an inner end wall, said body being open at the top and one end. The body may be of any suitable construction, and any suitable material or combination of materials may be used. In this instance I have shown the light weight durable construction next described. The body includes a rectangular shell 12 (Fig. 3) of open mesh wire fabric the strands of which may be connected by electric welding. The shell is composed of a bottom, side walls upstanding from opposite edges of the bottom, and an end well upstanding from one end of the bottom, and constituting the entire end wall of the trap body. The shell bottom is reinforced by a sheet metal bottom plate 13 fixed to the bottom of the shell and having upstanding ears 14 reinforcing the lower portions of the shell sides, and sheet metal reinforcing strips 15 fixed to the upper edges of the shell sides. The bottom 13 may be fixed to the shell in any suitable way, preferably by a sheet metal clamping plate 16 bearing on the upper side of the shell bottom, and rivets 17, (Figure 1) connecting said plate with the bottom.

18 designates a tilting platform having a pivotal connection between its ends with the body sides, and biased by a weight 19 (or a spring) so that its outer end is normally depressed and its inner end raised as shown by Figure 1. The inner end of the platform is adapted to be depressed by the weight of an animal thereon. To the platform is fixed a trigger operating crank arm 20 preferably located at the pivotal axis of the platform.

21 designates a trigger which is preferably a rod engaged with the wrist pin 22 of the crank arm, and caused to move endwise in fixed guides 23 on the body when the platform is moved.

24 designates the angular cover which is formed to close the open top and the open end of the body when the trap is sprung. One end of the cover has a pivotal connection with the body sides near the closed end of the body.

25 designates a trigger engaging finger fixed to the inner end of the cover and caused to swing by swinging movements thereof.

The arrangement is such that when the trap is closed as shown by Figure 2, the trigger 21 is yieldingly projected by the platform into the path in which the finger 25 swings, and the finger is separated from the trigger, and when the cover is raised to set the trap, the finger 25 swings to the position shown by Figure 1 and automatically engages the trigger which yields inward sufficiently to permit the finger to move across it, and then moves outward into engagement with the finger, and acts through the finger to hold the cover in a raised position. The tilting of the platform 18 caused by the weight of an animal on its inner end causes the retraction of the trigger and permits the closing of the cover.

The pivotal connection between the platform 18 and the body preferably includes a pintle rod 27 (Figure 5) carrying the crank arm 20 and fixed to the platform by any suitable means. The end portions of the rod 27 are journalled in bearings 28 (Figure 3) in the body sides, said bearings being preferably formed in the reinforcing ears 14.

The pivotal connection between the cover 24 and the body preferably includes a pintle rod 29 (Fig. 4) carrying the finger 25 and fixed to the cover by any suitable means. The end portions of said rod are journalled in bearings 30 (Fig. 3) in the body sides, said bearings being preferably formed in the reinforcing strips 15.

It will be seen that the trap is sensitive and adapted to be sprung by any weight sufficient to tilt the platform to the position shown by Figure 2, and that the trap is adapted to be set instantaneously by the operation of swinging the cover to its open position.

The trap may be made in different sizes so that it may be of suitable size to catch a small animal such as a mouse, and of suitable size to catch a larger animal. For example, the trap may be of suitable size to catch a fox.

The inner end of the trap body may be provided with a bait holder designated by 33.

If desired the construction of the trap body and cover may be sectional and such that the trap is foldable into compact form for storage and shipment.

I prefer to provide cover confining means, especially in a large trap, operable by the closing of the cover to prevent the opening thereof by an animal within the trap. In this instance I have embodied said means in a hooked ear 34 on the forward end of the clamping plate 16, and a lever composed of arms 35 and 36 pivoted at 37 on the forward end of the cover. The arm 35 is provided with a hook 38 which automatically engages the ear 34 as shown by Figure 6, when the cover closes. The arm 36 is manually movable inward to swing the arm 35 outward and disengage its hook 38 from the ear 34. When the cover is thus confined the trap may be carried by a handle 40 on the cover.

The cover may be provided with ears 41 adapted to bear on the outer sides of the strips 15 when the cover is closed.

The trigger 21, the connections between it and the platform 18 whereby the trigger is moved in a predetermined path by oscillating movements of the platform, and the finger 25 fixed to and movable by oscillatory movements of the cover, constitute the best embodiment of which I am aware of means cooperating with the platform to releasably confine the cover in a raised position when the platform is in its normal position, operable by the tilting of the platform to permit the closing of the cover. I do not limit myself, however, to said embodiment and may otherwise embody means organized to function as above stated, without departing from the spirit of the invention.

The wire mesh shell 12 constitutes the major portion of the body so that the weight of the body is reduced to a minimum. The sheet metal reinforcing ears 14, held by the bottom plate 13 in contact with the lower portions of the shell sides provide the bearings 28 for the pintle rod 27. The sheet metal reinforcing strips 15 on the upper edges of the shell sides provide the bearings 30 for the pintle rod 29. Said reinforcing ears 14 and strips 15 are of lmited area and permit the utilization of wire mesh fabric as the major portion of the body.

I claim:

1. A box trap comprising a body including a bottom, side walls, and an inner end wall, said body being open at the top and one end, a tilting platform having a pivotal connection between its ends with the body sides and biased so that its outer end is normally depressed and its inner end is depressible by an animal entering the trap, a trigger operating crank arm fixed to the platform, a trigger engaged with the crank arm and movable by the platform, an angular cover formed to close the open top and end of the body and pivoted at one end to the body sides, and a trigger engaging finger fixed to the inner end of the closure and caused to swing by swinging movements thereof, the arrangement being such that when the trap is closed by the cover the trigger is yieldingly projected by the platform into the path of said finger and the finger is separated from the trigger, and when the cover is raised to set the trap, the finger automatically engages the trigger and holds the closure in a raised position, the tilting of the platform caused by the weight of an animal causing the retraction of the trigger and permitting the closing of the cover.

2. A trap as specified by claim 1, the pivotal connection between the platform and the body including a pintle rod carrying said crank arm and fixed to the platform, said rod being journalled in bearings in the body sides.

3. A trap as specified by claim 1, the pivotal connection between the cover and the body including a pintle rod carrying said finger and fixed to the cover, said rod being journalled in bearings in the body sides.

4. A box trap comprising a body including a bottom, side walls, and an inner end wall, said body being open at the top and one end, a tilting platform having a pivotal connection between its ends with the body sides and biased so that its outer end is normally depressed and its inner end is depressible by an animal entering the trap, an angular cover formed to close the open top and end, and pivoted at one end to the body sides, and means cooperating with the platform to confine the cover in a raised position when the platform is in its normal position, said means being operable by the tilting of the platform from said position to permit the closing of the cover.

5. A box trap comprising a body including a botom, side walls, and an inner wall, said body being open at the top and one end, a tilting platform having a pivotal connection between its ends with the body sides and biased so that its outer end is normally depressed and its inner end is depressible by an animal entering the trap, an angular cover formed to close the open top and end and pivoted at one to the body sides, means cooperating with the platform to confine the cover in a raised position when the platform is in its normal position, said means being operable by the tilting of the platform from said position to permit the closing of the cover, and cover confining means operable by the closing of the cover to prevent the opening thereof by an animal in the trap.

FREDERICK J. HENRY.